Aug. 11, 1970  G. E. BARKER  3,523,676
PULSED SOLENOID CONTROL VALVE
Filed Feb. 26, 1969  3 Sheets-Sheet 1
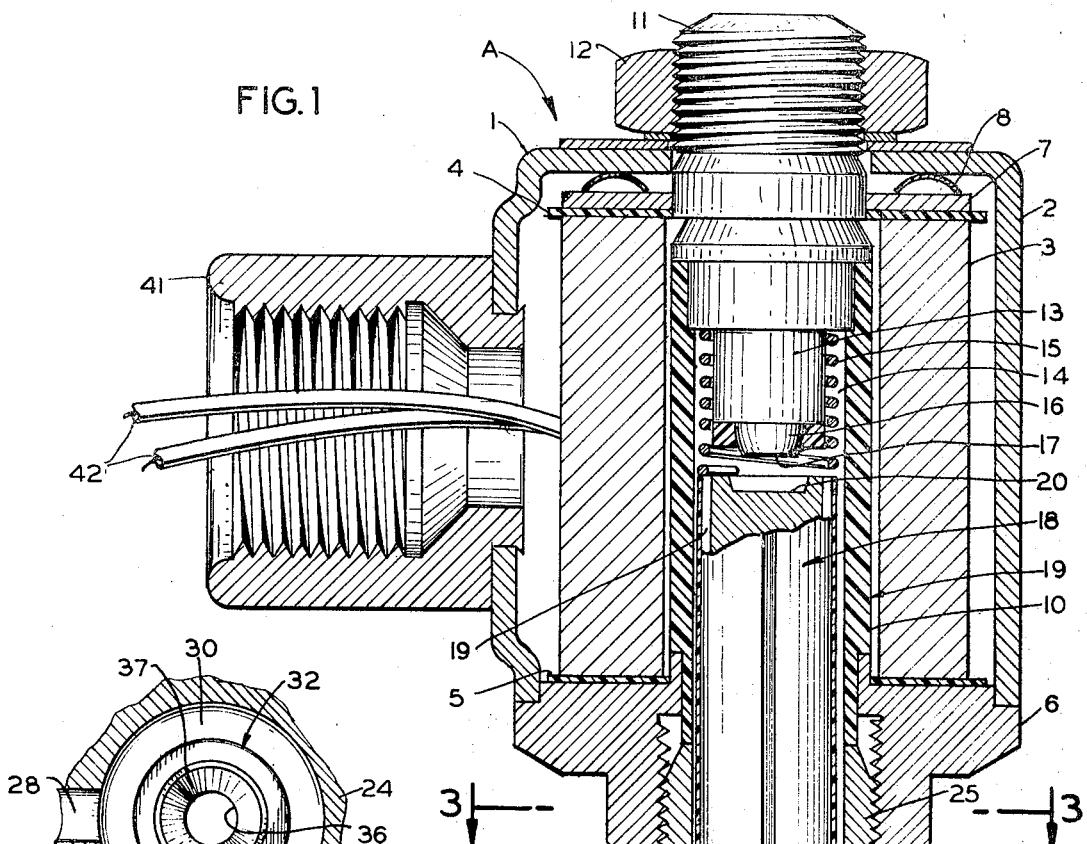
FIG. 1
FIG. 2
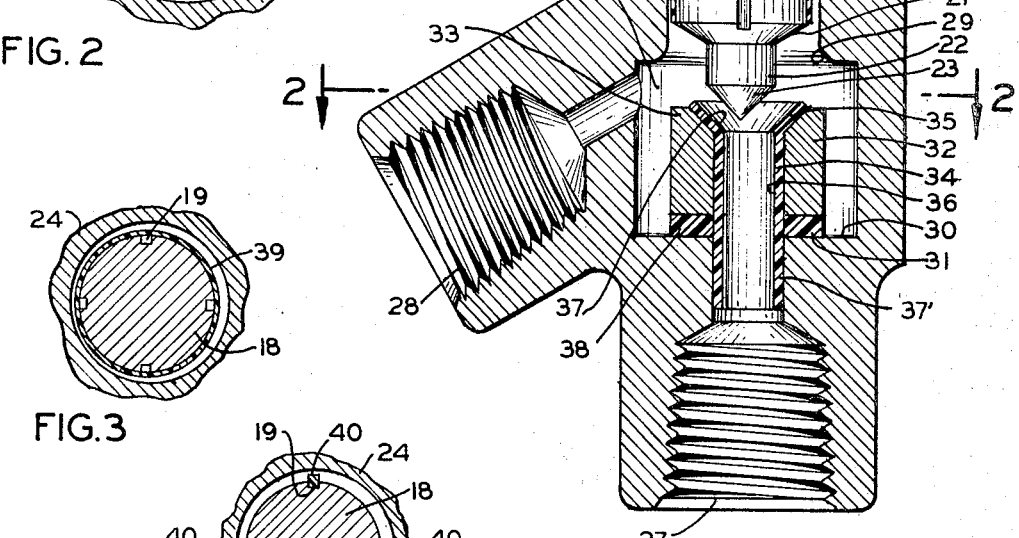
FIG. 3
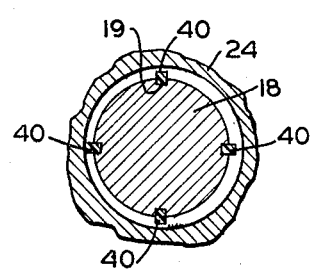
FIG. 4
INVENTOR
GEORGE E. BARKER
BY
Robert J. Schaap
ATTORNEY

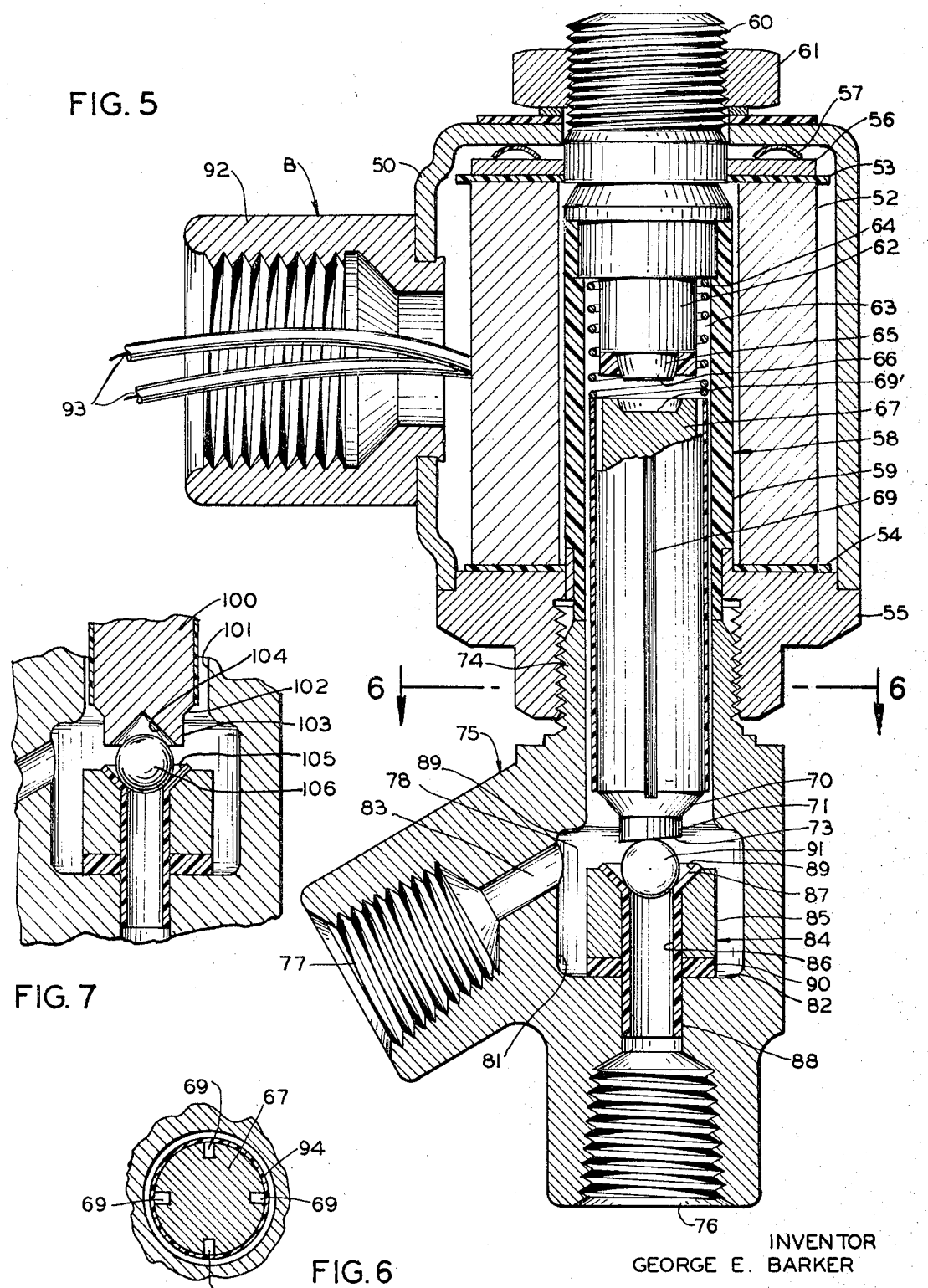

Aug. 11, 1970          G. E. BARKER          3,523,676

PULSED SOLENOID CONTROL VALVE

Filed Feb. 26, 1969          3 Sheets-Sheet 3

INVENTOR
GEORGE E. BARKER
BY
*Robert J. Schaap*
ATTORNEY

United States Patent Office 3,523,676
Patented Aug. 11, 1970

3,523,676
PULSED SOLENOID CONTROL VALVE
George E. Barker, St. Louis, Mo., assignor to Monsanto Company, St. Louis, Mo., a corporation of Delaware
Continuation-in-part of application Ser. No. 457,969, May 24, 1965, which is a continuation-in-part of application Ser. No. 412,921, Nov. 23, 1964. This application Feb. 26, 1969, Ser. No. 802,623
Int. Cl. F16k 31/06
U.S. Cl. 251—141                     31 Claims

ABSTRACT OF THE DISCLOSURE

A unique seating and vibration control arrangement in a dithering valve designed to reduce axial rebound vibration of a valve plunger through side-to-side radial displacement of the plunger. In one embodiment, the valve plunger is tapered with a conically shaped end and engages a conically shaped seating face. In a second embodiment, the plunger has a flat lower end and engages a seating ball which is disposed in the conically shaped seating surface of the seat.

---

This application is a continuation-in-part of my copending application Ser. No. 457,969, filed May 24, 1965, now abandoned, relating to pulse solenoid control valve which is in turn a continuation-in-part of my copending application Ser. No. 412,921, filed Nov. 23, 1964, now Pat. No. 3,424,951, and which relates to electrically operated control valves.

This invention relates in general to certain new and useful improvements in control valves, and more particularly to an electrically operated valve control system which is capable of modulating action.

Recently, the use of electronic instrumentation has grown steadily in the chemical processing industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation of instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control vaves, such as the air-motor control valve was a logical development in chemical processing instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure.

Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

It is, therefore, the primary object of the present invention to provide a pulsed solenoid control system which is capable of controlling flow over a wide dynamic range.

It is another object of the present invention to provide a pulsed solenoid control system of the type stated which is relatively simple in its operation and has a long operating life.

It is a further object of the present invention to provide a specific pulsed solenoid control valve for use with the above mentioned control system which eliminates the need for a stuffing box and its inherent hysteresis.

It is an additional object of the present invention to provide a pulsed solenoid control valve of the type stated which can be used in both low pressure and high pressure fluid systems.

It is another salient object of the present invention to provide an electrically operable control valve of the type stated which is adaptable for use in bench-scale equipment, pilot-plant equipment and commercial process equipment.

It is still a further object of the present invention to provide a specific pulsed solenoid control valve of the type stated which materially reduces high frequency flow noise.

It is also an object of the present invention to provide a pulsed solenoid control valve of the type stated which advantageously employs the radial vibrations of a valve plunger to dissipate the energy creating axial rebound vibrations.

It is yet another salient object of the present invention to provide a pulsed solenoid control valve of the type stated which can be built into a relatively inexpensive small compact unit and has a high degree of reliability.

With the above and other objects in view, my invention resides in the novel features of form, construction, arrangement and combination of parts presently described and pointed out in the claims.

In the accompanying drawings (3 sheets):

FIG. 1 is a vertical sectional view, partially broken away, of a pulsed solenoid control valve constructed in accordance with and embodying the present invention;

FIGS. 2 and 3 are fragmentary sectional views taken along lines 2—2 and 3—3, respectively, of FIG. 1;

FIG. 4 is a fragmentary horizontal sectional view showing a modified form of valve plunger for use with the control valve of FIG. 1;

FIG. 5 is a vertical sectional view, partially broken away, of a modified form of pulsed solenoid control valve constructed in accordance with and embodying the present invention;

FIG. 6 is a fragmentary sectional view taken along line 6—6 of FIG. 5;

FIG. 7 is a vertical sectional view, partially broken away, of another modified form of pulse solenoid control valve constructed in accordance with and embodying the present invention;

GENERAL DESCRIPTION

Figure 9:
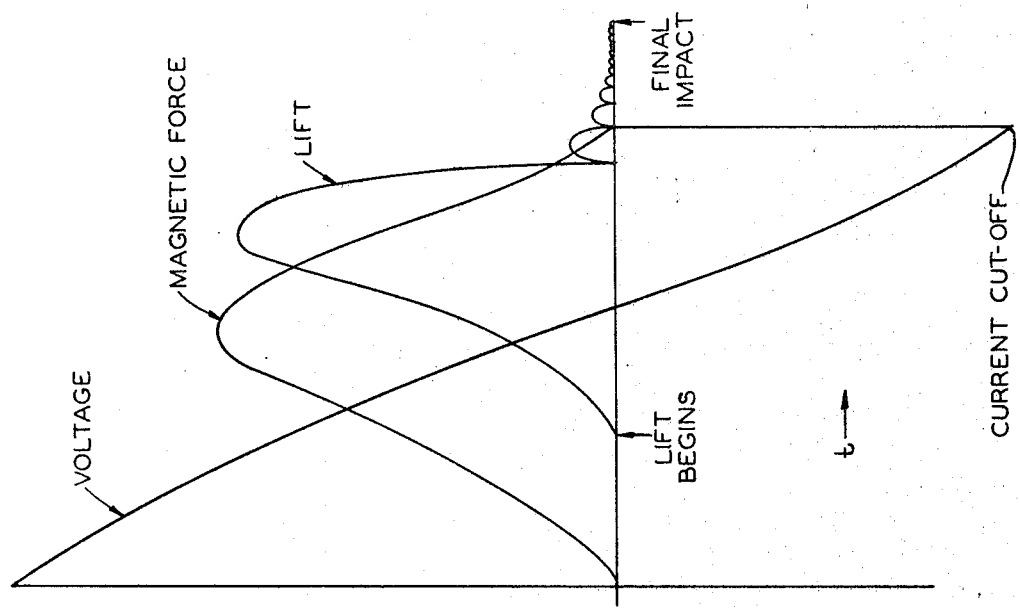
FIG. 9 is a diagrammatical view showing the pulse voltage wave form applied to the solenoid coil, the magnetic force lines produced and the rebound vibrations in the valve of the present invention.

Generally speaking, the present invention resides in an electrically operable control valve which is capable of modulating control action by varying the voltage supplied to the coil of the control valve. The valve is designed to control fluid flow in response to changes of a measured physical variable, such as liquid level. Consequently, the electrically operable control valve can find a wide variety of uses, such as a liquid level controller, a differential pressure controller or a temperature controller. The valve is provided with inlet and outlet ports, the inlet port having a valve seat. A vibratory plunger shifts with respect to the valve seat for controlling the flow of fluid through the valve housing. The valve plunger is metallic and can preferably be provided with a Teflon jacket. The valve plunger may also be provided with a plurality of circumferentially spaced axially extending spacer strips for maintaining radial alignment. The spacer strips are formed of a tetrafluoroethylene polymer normally marketed under the trade name "Teflon." The valve plunger is actuable by a solenoid coil which is associated with the valve housing and surrounds the plunger.

A control circuit is provided for measuring the changes in the measured physical variable. The control circuit generally includes a sensor for measuring the change of the sensed physical variable and a mechanism for converting the measured physical property change into a proportional resistance change. The control circuit also includes a relaxation oscillator which is designed to convert the proportional resistance change into a sequence of times pulses. Finally, a silicon controlled rectifier is provided for transmitting current pulses in timed relationship to the solenoid coil for actuating the plunger. In effect, it is thereby possible to maintain controlled vibration of the plunger for regulating fluid flow in proportion to the change of the sensed physical variable.

The explanation of this flow control phenomenon involves a rather new control principle, namely, controlled mechanical vibration of the plunger at line frequency. This mechanical vibration is a forced vibration caused by the pulsating force exerted on the plunger by the solenoid coil. During the pulse cycle, the force exerted on the plunger starts from a zero level, reaches a maximum level and returns to a zero level. If the average force exerted on the plunger by this pulsating voltage application is equal to or greater than the spring force which is designed to hold the plunger in a closed position, the plunger will snap open in a conventional solenoid-valve fashion. If however, the average force exerted on the plunger by the coil is less than the spring force, but the maximum force is greater than the spring force, then the plunger will be lifted from the valve seat during a portion of the pulse cycle. During the lift portion of the cycle, the motion of the plunger can then be described by conventional force-mass differential equations. The effective valve opening can then be conveniently described by the time integral of the vertical lift of the plunger.

A conventional valve seat of the type normally found in solenoid operable valves has many inherent disadvantages. The valve seats generally found in conventional solenoid valves may be formed of a suitable metal such as stainless steel or it may be formed of a suitable synthetic resin or a plastic material. However, with a rapidly vibrating plunger, rebound vibrations are almost inherent in the operation of the valve and this somewhat limits the maximum flow attainable. Moreover, continued vibration may cause valve seat wear and may create radial displacement of the valve plunger. This type of uncontrolled radial displacement will result in excessive leakage due to the inevitable lack of concentricity of the orifice face.

The present invention contemplates a unique type of valve plunger and valve seat combination which advantageosuly employs the controlled radial vibrations to eliminate uncontrolled axial rebound vibrations of the valve plunger. By employment of a constrained conically shaped Teflon seat, the effect of rebound vibrations is almost completely eliminated. This type of arrangement has an additional advantage in that it is now possible to employ variable amplitude sine wave power to energize the solenoid coil, due to the fact that rebound vibrations have been eliminated.

DETAILED DESCRIPTION

Referring now in more detail and by reference characters to the drawings which illustrate practical embodiments of the present invention, A designates an electrically operated solenoid control valve substantially as shown in FIGS. 1 and 2. The control valve A is operatively connected to and operable by a control circuit which is more fully illustrated and described in detail in the aforementioned copending application.

The control valve A generally comprises an outer control valve housing 1 including a somewhat cylindrical coil housing 2. Disposed within the housing 2 is a helically wound cylindrical solenoid coil 3 and disposed upon opposite ends thereof are upper and lower insulating washers 4 and 5, respectively. The insulating washer 5 is facewise disposed upon the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIG. 1, it can be seen that the springs 8 are interposed between the upper surface of the flux plate 7 and the undersurface of the top wall forming part of the coil housing 2.

The coil housing 2 and the solenoid coil 3 are centrally apertured to accommodate a plunger tube assembly 9 which comprises a cylindrical tube 10 disposed axially within the coil housing 2 and which contains a central nonmagnetic section surrounded by magnetic sections at each transverse end. Secured to the upper end of the tube 10 is a plug 11 which is retained by a nut 12, substantially as shown in FIG. 1. The plug 11 projects inwardly into the tube 10 and at its lower end, is diametrally reduced in the provision of a downwardly extending boss 13, thereby providing an annular relief 14 for accommodating a compression spring 15. Integrally formed with and extending downwardly from the lower end of the boss 13 is a projection 16, the lower face of which serves as an upper plunger stop 17. Reciprocatively disposed within the tube 10 and being adapted for vibratory movement therein is a valve plunger 18 which is provided with four radially spaced axially extending fluid ducts or reliefs 19. At its upper end, the plunger 18 is milled to provide a plunger head 20.

At its lower end, the valve plunger 18 is milled to form a relatively flat inwardly and downwardly tapering side wall 21 which forms an angle of approximately 45° with respect to the axial centerline of the plunger 18. The side wall 21 integrally merges into a downwardly projecting plunger seating plug 22. The plug 22 is also formed with a pointed lower end formed by a downwardly and inwardly projecting conically shaped bottom wall 23. By further reference to FIG. 1, it can be seen that the side wall extends at an angle of 45° with respect to the axial centerline of the plunger 18 so that the overall angle of the conical section with respect to the plunger axial centerline is within the range of 85° to 95° and preferably 90°.

The base plate 6 is internally bored and threaded to accommodate a valve body 24 which is integrally formed with an externally threaded fitting 25 at its upper end, substantially as shown in FIG. 1. The valve body 24 is internally formed with a substantially large fluid chamber 26 communicating with a fluid inlet port 27 and a fluid outlet port 28 formed in the valve body 24. The fluid inlet port 27 and the outlet port 28 may be internally threaded to accommodate pipe fittings, as desired. The fluid chamber 26 is formed by a top wall 29, an annular sidewall 30 and a bottom wall 31.

Disposed within the chamber 26 is a valve seating mechanism 32 which generally comprises a fairly rigid retaining sleeve 33, preferably formed of stainless steel or similar hard non-corrosive material and which is provided with an axial bore 34. The retaining sleeve 33 is countersunk at the upper end of the bore 34 forming a conically shaped wall 35.

Snugly fitted within the bore 34 and extending axially therethrough is a hollow tube 36, preferably formed of Teflon, Buna N rubber, or plastic material sold under the trademark Viton A and which integrally includes an outwardly flaring valve seat 37 at its upper end. By reference to FIG. 1, it can be seen that the valve seat 37 is seated in facewise engagement with the relatively flat conically shaped wall 35. Moreover, it can be seen that the tube 36 extends beyond the lower end of the retaining sleeve 33 in the provision of an extended end 37' and into the inlet port 27. In this connection, it should be noted that the tube 36 is sized to seat snugly against the wall of the port 27 in a fluid tight seating arrangement. The valve seat 37 is flared outwardly at an angle within the range of 80 to 84°, and preferably 82°. It was found in connection with the present invention that by forming the bottom wall 23 of the plunger 18 with an angle of 90° and by forming the valve seat 37 with an angle of 82°, with respect to the axial centerline thereof, flow noise was reduced to a minimum.

While the tube 36 and integrally formed valve seat 37 may be formed of many plastic or synthetic resinous materials which are capable of resisting cold flow, it has been found that Teflon has produced the most desirable results. Teflon, however, has a tendency to "creep" when subject to strain and this creep has been eliminated by the metal retaining sleeve 33. Secured to the underside of the retaining sleeve 33 is a cylindrical relatively thick washer 38 which is preferably formed of the same material as the tube 36 and the seat 37 and which serves as a cushion for the impact of the plunger 18 against the valve seat 37. In the preferred embodiment of this invention, the washer 38 is, therefore formed of the same type of Teflon material as the seat 37.

By means of the above outlined construction, it can be seen that the valve body 24 can be removed by threadedly disconnecting the threaded fitting 25 from the base plate 6. Moreover, the valve seating mechanism 32 can easily be removed and replaced when necessary. Inasmuch as the seating mechanism 32 is retained within the chamber 26 by the extended end 37' of the tube 36, the seating mechanism 32 can really be pulled out of its seated position by removing the tube 36 from the inlet port 27.

In addition to the obvious effect on leakage, the seat composition has a strong effect on the secondary or rebound vibrations. As previously indicated, the secondary vibrations are undesirable inasmuch as they adversely affect the instability of the valve and produce much of the flow noise associated with pulsed solenoid operations. The Teflon material was found to produce a desired elastic coefficient for the wide range of stable operation and was, therefore, found to produce very suitable results when employed as a valve seat.

Without the steel restraining sleeve 33, the Teflon material exhibited a memory effect due to cold flow in operation at very low amplitude vibrations. The restraining effect of the stainless steel retaining sleeve 33 practically eliminated this cold flow. Moreover, by virtue of the fact that the valve seat 37 is seated in facewise engagement against the conically shaped wall 35, the impact of the plunger 18 will not create any displacement of the seat 37.

It was also found that flow noise was substantially reduced by jacketing the valve plunger 18 with a Teflon sheath 39 which is circumferentially disposed around the plunger 18 for its entire length. However, a sufficient amount of clearance was maintained between the outer cylindrical surface of the sheath 39 and the interior angular surface of the tube 10 to permit fluid flow. When the sheath 39 was eliminated, the valve plunger 18 appeared to have two stable vibration states for each power level to the solenoid coil 3. In this two-state vibration condition, transition from one state to the other state occurred within 16 milliseconds and produced a flow offset of approximately 5 percent. With the Teflon sheath 39 circumferentially disposed about the plunger 18, it was found that only one vibration state existed and flow noise was reduced to less than 0.2 percent. It is believed that this reduction of the two stable vibration states and elimination of transition therebetween was due to a combination of minimizing friction between the cylindrical tube 10 and the valve plunger 18, and to a dampening of uncontrolled radial vibrations which is hereinafter discussed in more detail. It should also be recognized that the sheath 39 could be formed of Buna N rubber or Viton plastic as well.

It has also been found that it is possible to reduce the flow noise by inserting Teflon strips 40 into each of the four radially spaced fluid ducts 19, substantially as shown in FIG. 4. In this embodiment of the valve plunger, the Teflon sheath is eliminated. The four radially spaced axially extending strips of Teflon reduce the two stable vibration states to a single state. It should also be understood that a sufficient amount of clearance is provided between the annular surface of the valve plunger 18 and the interior annular surface of the tube 10 so that fluid flow can be maintained therebetween.

The valve A is also provided with a fitting 41 for accommodating a pair of leads 42 to the solenoid coil 3 in the manner as shown in FIG. 1. The leads 42 are ultimately connected to the control circuit C which is more fully illustrated and described in detail in the aforementioned copending application.

It has been found that rebound vibrations of the valve plunger tend to materially limit the maximum flow attainable and hence the dynamic range of operation of a control valve. In the control valve described in the aforementioned copending application, the life of the valve seat was considered to be remarkable in view of the fact that the plunger was vibrating at least 60 times per second. The long seat life was the result of low unbalanced forces on the plunger so that maximum seating pressure was well within the elastic range of the valve seat. However, the rebound vibrations of the plunger and the controlled vibrations, to some extent for that matter, inevitably cause seat wear thereby causing indentations on the Teflon seat. Moreover, uncontrolled radial vibrations of the valve plunger would tend to result in excessive leakage due to the inevitable lack of concentricity of the orifice face in the valve seat. The seat-plunger arrangement of the present invention eliminates these difficulties. Inasmuch as the valve seat 37 is designed with a smaller acute angle with respect to the axial centerline thereof than the conically shaped bottom wall 23 of the valve plunger 18, the valve plunger 18 has a tendency to orient itself axially with respect to the valve seat 37. Moreover, the conical seating surface completely eliminates the effect of rebound vibrations.

By reference to FIG. 1, it can be seen that the axial centerline of the valve plunger 18 is slightly offset with respect to the valve seat 37. Thus, when the lower face of the valve plunger 18 initially contacts the valve seat 37, it will not rebound axially since it is not completely concentric with the valve seat. In actuality, the valve plunger will rebound radially until it strikes the opposite surface of the conically shaped portion of the valve seat 37. It can be observed, that if the valve plunger moved axially, the same energy would be required to be dampened as if the valve plunger moved radially. The valve plunger 18 does not lose any more energy on each strike with the valve seat, than when it strikes the valve seat from an axial rebound vibration. However, when the valve plunger is designed to strike the seat in radial rebound vibrations, it will strike the seat much more often. The side-to-side faster radial displacement enables the excess energy in the valve plunger to be dissipated much more rapidly.

While the valve plunger has been described as being axially offset with respect to the valve seat, it would be also observed that any lack of symmetry will create a condition where the valve plunger 18 strikes the valve seat 37 off center. For example, a high spot on the valve seat 37 will enable the same condition to result. For that matter, it is also possible to create any asymmetrically weighted valve plunger so that one side of the valve plunger weighs more than the other. In this manner, the valve plunger will tend to move slightly offset from an axial position. This condition is not necessarily desirable and it is generally preferable to locate the valve plunger asymmetrically with respect to the valve seat.

The energy which is normally dissipated by the high amplitude, relatively slow vertical rebound vibrations of the valve plunger is converted by the much faster side-to-side bounces off the sloping surfaces of the valve seat 37. In this manner, the energy which was normally employed in the axial rebound vibration of the valve plunger 18 was converted to controlled radial vibration. By reference to FIGS. 8 and 9, it can be seen that the rebound vibrations in the valve of the present invention are substantially reduced, as a result of this unique seat-plunger design. With the elimination of these rebound vibrations, it has been found that it is now feasible to power the solenoid coil 3 with a variable amplitude sine wave power such as a Variac without creating instability or flow noise. It should be understood that more highly efficient control action is obtained through the use of the control circuit C described in the aforementioned copending application, but that highly efficient results are also obtained by employment of a source of variable amplitude sine wave power.

The existence of the unique valve stability in pulsed solenoid operations can be explained by the fact that the valve plunger 18 is in a motionless state at the start of a forced cycle. This motionless state provides the reason for the success in the use of a half-wave silicon controlled rectifier power source for obtaining effective control. In the device of the aforementioned copending application, amplitude control of a sine wave power source would not have been effective inasmuch as it would not be possible to obtain a quiescent period during the period of the rebound vibrations. By the employment of a silicon controlled rectifier power source in the device of the aforementioned copending application, the forced pulse is followed by a long period, the quiescent period, or negative cycle in which no force pulse is produced by the solenoid. This allows the vibrations of the valve plunger to be extinguished prior to the next pulse. When compared to the use of sine wave power, an identical force pulse is produced during the negative cycle and it is necessary to have the vibrations extinguished before this cycle begins. Accordingly, heretofore it was necessary to obtain silicon controlled rectifier power for great dynamic range of a control valve. By eliminating the axial rebound vibration in accordance with the present invention, it has been found that it is possible to employ a sine wave power source for energization of the solenoid coil 3. Since the vibrations of the valve plunger rapidly extinguish themselves through both axial and radial vibration on the valve seat, the quiescent period or negative cycle is no longer required.

Figure 8:
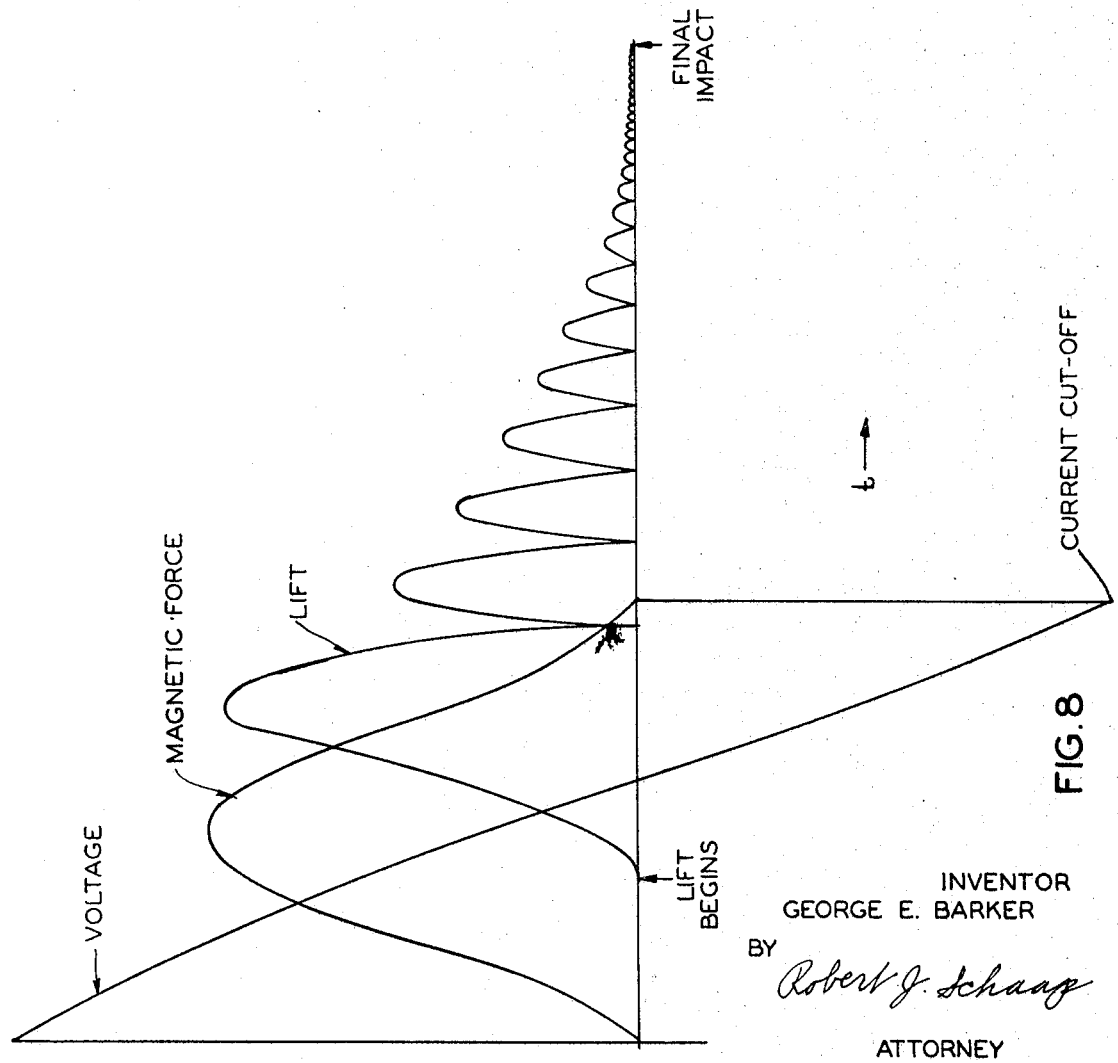
FIG. 8 is a diagrammatical view of a pulsed voltage wave form applied to the solenoid coil in timed relation to the magnetic force produced by the solenoid and in timed relation to the wave form showing the vibration of the valve plunger of a pulsed solenoid control valve having a conventional valve seat.

FIG. 8 discloses the voltage wave form and the course of the rebound vibrations of the valve plunger in the valve of the aforementioned copending application. It is not possible to accurately measure or provide an oscilloscope picture of the blip pattern of the valve A of the present invention inasmuch as the rebound vibrations are too rapid and too small to pick up on an oscilloscope screen. However the blip pattern showing the rebound vibrations of the valve plunger can be fairly accurately estimated and FIG. 9 illustrates the course of the rebound vibrations of the valve plunger of the present invention. It can be seen that the final impact of the valve plunger is materially reduced in the valve of the present invention and moreover, the rebound vibrations themselves have been substantially subdued.

It is possible to provide a modified form of pulsed solenoid control valve B substantially as shown in FIGS. 5 and 6.

The control valve B generally comprises an outer control valve housing 50 including a somewhat cylindrical coil housing 51. Disposed within the housing 51 is a helically wound cylindrical solenoid coil 52 and disposed upon opposite ends thereof are upper and lower insulating washers 53 and 54, respectively. The insulating washer 54 is facewise disposed upon the upper surface of a base plate 55 which forms parts of the outer coil housing 51. Facewise disposed upon the upper insulating washer 53 is a circular flux plate 56. The assembly of the solenoid coil 52, the insulating washers 53, 54 and the flux plate 56 is suitably held in place and urged downwardly toward the base plate 55 by means of a set of flat springs 57. By reference to FIG. 5, it can be seen that the springs 57 are interposed between the upper surface of the flux plate 56 and the undersurface of the top wall forming part of the coil housing 51.

The coil housing 51 and the solenoid coil 52 are centrally apertured to accommodate a plunger tube assembly 58 which comprises a cylindrical tube 59 disposed axially within the coil housing 51 and which contains a central non-magnetic section surrounded by magnetic sections at each transverse end. Secured to the upper end of the tube 59 is a plug 60 which is retained by a nut 61, substantially as shown in FIG. 5. The plug 60 projects inwardly into the tube 59 and at its lower end, is diametrally reduced in the provision of a downwradly extending boss 62, thereby providing an annualr relief 63 for accommodating a compression spring 64. Integrally formed with and extending downwardly from the lower end of the boss 62 is a projection 65, the lower face of which serves as a plunger stop 66. Reciprocatively disposed within the tube 59 and being adapted for vibratory movement is a valve plunger 67 which is provided with four radially spaced axially extending fluid ducts or reliefs 69. At its upper end, the plunger 67 is milled to provide a plunger head 69.

At its lower end, the valve plunger is milled to form a relatively flat inwardly and downwardly tapering side wall 70 which forms an angle of approximately 45° with respect to the axial centerline of the plunger 67. The side wall 70 integrally merges into a diametrally reduced downwardly projecting plunger seating plug 71 having a relatively flat seating face 73.

The base plate 55 is internally threaded in order to accommodate the externally threaded upper end 74 of a valve body 75, the latter being substantially similar to the previously described valve body 24. The valve body 75 is formed with an inlet port 76, and an outlet port 77 which communicates with a rather large internal fluid chamber 78. Moreover, the chamber 78 is formed by an annular side wall 79 which integrally merges into an upwardly and inwardly tapering top wall 80 and with a bottom wall 81. The fluid port 76 forms an inlet orifice 82, with the internal chamber 78 and the outlet port 77 forms an outlet orifice 83 with the internal chamber 78. Moreover, each of the ports 76, 77 can be internally threaded for accommodating standard pipe fittings as desired.

Internally disposed within the chamber 78 is a seating mechanism 84 which comprises a cylindrical retaining sleeve 85 preferably formed of stainless steel and which is provided with a central axial bore 86. The axial bore 86 merges at its upper end into a conically shaped outwardly tapering retaining wall 87. Disposed within the axial bore 86 is a Teflon tube 88 having an outwardly flared valve seat 89 integrally formed therewith at its upper end, substantially as shown in FIG. 6. It can be seen that the Teflon tube 88 is sized to fit snugly within the axial bore 86 in fluid tight engagement with the walls of the bore and moreover, the seat 89 is sized to fit snugly against the conically shaped wall 87. Again by definition, the overall angle of the seat 89 is approximately within the range of 80° to 84° and preferably 82° with respect to the axial centerline of the retaining sleeve 85. Interposed between the retaining sleeve 85 and the bottom wall 81 of the housing 75 is a Teflon washer 90. As in the case of the valve A, it was found that the seat material, such as Teflon, has a strong effect on the secondary or rebound vibrations of the valve plunger 67. It was also found in connection with the present invention that a seat formed of Teflon produced the most desirable results of any material analyzed since it possessed a high elastic coefficient but was sufficient for an adequately stable range of operation.

Interposed between the lower face of the valve plunger 67, that is the seating face 73 and the valve seat 89 is a seating ball 91 preferably formed of a relatively hard stainless steel material. In the pulsed solenoid valve B, the seating ball replaces the tapered conically lower end of the valve plunger as in the case of the valve A. Moreover, it can be seen that the axial movement of the valve plunger 67 is limited so that the ball 91 is never completely permitted to become displaced from the conically shaped seating area formed by the valve seat 89. As the valve plunger 67 vibrates during the controlled vibration in operation, the seating face 73 will force the seating ball 91 against the conically shaped valve seat 89. The conically shaped upper wall 87 forming part of the retaining sleeve 85, will permit deformation and creep of the Teflon seat. Moreover, it can be seen that the Teflon tube 88 is formed with an extended lower end which extends into the port 76 for convenient insertion and removal of the valve seat mechanism 84.

By reference to FIG. 5, it can be seen that the seating face 73 is inclined with respect to the axial center line of the valve plunger 67 and with respect to the axial centerline of the valve seat 89. Accordingly, when the valve plunger first engages the seating ball 91, it will urge the ball in a direction which is angular with respect to the axial center line of the valve seat.

By use of the above-styled arrangement, it is possible to again obtain controlled radial vibration. The conically shaped seating surface 89 completely eliminates the effect of the axial rebound vibrations by permitting the seating ball 91 to become involved very fast radial oscillations. The energy which was normally employed in the axial rebound vibration of the valve plunger 67 has been dissipated by the very much faster side-to-side bounces of the seating ball 91 off the sloping surface of the valve seat 89. In the case of the pulsed-solenoid valve B, it is now feasible to power the solenoid coil 52 with a variable amplitude sine-wave power source, such as a Variac without creating instability or flow noise.

Thus, when the lower face of the valve plunger 67 initially contacts the seating ball 91, neither the seating ball nor the valve plunger will rebound axially since there is a lack of concentricity between the valve plunger 67, the seating ball 91 and the valve seat 89. Inasmuch as the seating ball 91 will be urged in a direction which is angular with respect to the axial center line of the valve seat 89, the seating ball 91 will shift in a substantially radial direction with respect to the valve seat 89. In like manner, the valve plunger 67 will dissipate the rebound energy in a radial direction as opposed to an axial direction with respect to the valve seat 89. The same energy dissipation occurs essentially in the valve B as in the case of the valve A. In like manner, the side-to-side faster radial displacement enables the excess energy in the valve plunger to be dissipated much more rapidly.

The valve B is provided with a fitting 92 for accommodating a pair of leads 93 to the solenoid coil 52 in the manner as shown in FIG. 6. The leads 93 are ultimately connected to the control circuit described in the aforementioned copending application. Inasmuch as the control circuit is described in said copending application, it is neither ilustrated nor described in detail herein. As indicated above, it is also possible to use a source of variable amplitude sine-wave power source. However, the control circuit described in the aforementioned copending application has been found to still produce more desirable results because of the dynamic range provided and the close control over the vibration of the valve plunger 67.

It is possible to provide another modified form of control valve C which is similar to the valve B. Only a portion of the valve C has been illustrated in the drawings inasmuch as the remainder of the valve is substantially identical to the control valve illustrated in FIG. 5. The control valve C includes a valve plunger 100 which is reciprocatively disposed within a valve tube 101 and is adapted for vibratory movement therein. At its lower end, the valve plunger is milled to form a relatively flat inwardly and downwardly tapering side wall 102 which forms an angle of approximately 45° with respect to the axial center line of the plunger 100. The side wall 102 integrally merges into a diametrally reduced downwardly projecting plunger seating plug 103. The bottom wall of the plug 103 is milled to provide a conically shaped ball receiving cone 104.

Cooperatively disposed within the housing of the valve C is a valve seat 105 which is substantially identical to the valve seat 87 and is provided with a similar dimensional structure. Furthermore, the valve seat 105 is supported in the same manner as the valve seat 87. A seating ball 106 is cooperatively interposed between the ball receiving cone 104 and the valve seat 105. Furthermore, by reference to FIG. 7, it can be seen that the axial center lines of the ball receiving cone 104 and the valve seat 105 are not concentric. Accordingly, when the valve plunger 100 first engages the seating ball 106, the tapered side wall of the ball receiving cone will urge the seating ball 106 in a direction which is somewhat radial with respect to the axial center line of the valve seat 105. In like manner, the seating ball 106 and the valve plunger 100 will dissipate the rebound energy by radial displacement as opposed to axial displacement.

The diagrammatical view of FIG. 9 also illustrates the effect of rebound vibration with the valve B as compared to the rebound vibrations in the valve of the aforementioned copending application which is illustrated in FIG. 8. Again, it can be seen that by the controlled radial vibration of the valve plunger, both the amplitude and the time of the axial rebound vibration of the valve plunger 67 in the valve have been substantially reduced.

This "blip" pattern of the valve described in the aforementioned copending application is fully illustrated in FIG. 8 and compares the voltage force with the magnetic force and the lift of the valve plunger. This "blip" pattern described a condition where the plunger is generating voltage during the quiescent period in the same manner as an electric motor. Since the main control circuit is de-energized immediately after the cutoff of the silicon controlled rectifier, there is only an iron-loss load across the solenoid coil. This sudden change in the speed of the plunger at the impact of the valve seat produced a relatively large voltage "blip." Accordingly, measurements from an oscilloscope screen provide a desirable method of measuring the rebound constant.

The same method which was used to measure the "blip" pattern in the valve of the aforementioned copending application cannot be used to measure the "blip" pattern of the valves A and B in the present invention. As previously mentioned, the rebound vibrations are too small and occur too rapidly to measure accurately or depict on an oscilloscope screen. Here again the blip pattern showing the rebound vibration of the valve plunger 67 in the valve B can be fairly accurately estimated. This estimation of the blip pattern is the same as that presented in FIG. 9. In this case, it can be seen that the amplitude of the first "blip" after immediate impact with the seat was substantially reduced and the amplitude of each succeeding "blip" thereafter is substantialy reduced. Moreover, it can be seen that the time of final impact is materially shortened so that the need for a quiescent period between each succeeding force pulse is practically eliminated. Consequently, a variable amplitude sine-wave voltage source can be used without creating instability.

In connection with the pulsed-solenoid valve B, it has also been found that flow noise can be materially reduced by jacketing the plunger 67 in a Teflon sheath 94. Without the sheath 94 the plunger appears to have two stable vibration states for each power level to the coil. Again, as in the case of the valve A, transition from one state to the other state occurs within approximately 16 milliseconds and produces a flow offset of approximately 5 percent. With the sheath 94 surrounding the plunger 67 for its entire axial length, it has been found that only one stable-state of vibration exists and that flow noise as a result thereof has been reduced to less than 0.2 percent. The elimination of this two stable vibration state and transition therebetween is believed to be due to the existence of minimizing the friction between the exterior surface of the valve plunger 67 and the interior surface of the tube 59 and also to the damping of the uncontrolled radial vibrations. It should also be understood that there is sufficient clearance between the surface of the sheath 94 and the interior surface of the cylindrical tube 59 so that fluid flow may occur therebetween. It is also possible to eliminate the two stable vibration states from each power level to the coil by inserting Teflon strips in each of the four radially spaced axially extending fluid ducts 69. Here again, transition has been reduced and flow offset has been reduced from approximately 5 percent and flow noise reduced to less than 0.2 percent. Again, it should be understood that sufficient clearance is provided between the exterior surface of the valve plunger 67 and the interior surface of the tube 59 for permitting fluid flow therebetween.

Pulsed solenoid control action can be explained by the theory that the plunger is made to vibrate on an orifice by magnetic force and that flow control results from controlling the amplitude of the vibrations. This concept therefore permits a quantitative description of the operable range of control. There are two major conditions which must exist under the theory that flow control results from controlled vibration of a plunger. The first condition is that the maximum magnetic force generated by the solenoid coil must be greater than the combined spring and gravity forces which holds the plunger against the valve seat. If this condition did not exist, then vibration of the plunger would be impossible. The second condition is that the magnetic force averaged over the power cycle must be less than the force exerted by the spring. If this did not exist, the plunger would be held against the upper stop for at least a portion of the cycle and the normal hysteresis and instability of conventional solenoid valves would then result. In actuality, the average force must be even less than the theoretical average force due to dynamic instability effects. This vibration concept also suggests that the effective valve area and hence the flow rate is proportional to the time integral of the valve lift over the power cycle.

The explanation of the wide dynamic range of the valve herein described lies in almost complete absence of friction, thereby permitting very low amplitude vibrations. Even though the plunger vibrates at least sixty times a second, long seat life has been experienced as a result of low unbalanced forces on the plunger, so that the maximum seating pressure is well within the elastic range of the Teflon seat.

The invention is further illustrated by but not limited to the following examples:

Example 1

This example describes the efficiency and dynamic range of a pulsed-solenoid control valve in the aforementioned copending application, of which this application is a continuation-in-part. The control valve and control circuit described in said aforementioned copending application was combined in order to study the effect of the controllable factors which affect the operation of the control valve. In the control valve, a conventional Teflon seat was employed and prepared for use in a manner to be hereinafter described.

The valve employed was a Hoke S90A320CT solenoid valve which has the following valve dimensions:

Plunger weight—16 gms.
Plunger outer diameter—0.92 cms.
Plunger stop outer diameter—0.84 cms.
Plunger cross sectional area—0.67 cms.$^2$
Effective axial plunger length—4.4 cms.
Outer shell, outer diameter of plunger—4.1 cms.
Outer shell thickness—0.159 cms.
Orifice diameter—0.076 cms.
Orifice outer diameter—0.203 cms.
Effective orifice diameter—0.094 cms.
Air gap when plunger seated—0.125 cms.

The solenoid coil of the control valve was characterized by the following data.

Total coils turns—4000
DC resistance—265 ohms (including compensator resistors)
Wire size—33 ga.
Coil inner diameter—1.35 cm.
Coil outer diameter—2.98 cm.
Coil height—3.15 cm.

This valve had an all stainless steel construction and was fitted with a conventional Teflon seat and the valve which was constructed of type 430F stainless steel had an initial permeability of 200, a maximum permeability of 1400 and a saturation flux density of 14,000 grams. The orifice seating was milled approximately 0.005 inch from the surface which was followed by polishing with an 1800 grit diamond to a mirror finish. This operation produced an annular seating area of approximately 0.080 inch outer diameter of 0.030 inch inner diameter.

The control circuit employed and the various components which were used therein for the purpose of this example are described in detail in Example I of the aforementioned copending application. To be of use in a practical control operation, the combination of the controller and valve must be insensitive to ambient temperature changes and line voltage changes. As might be expected from the principle of operation, sensitivity to line voltage variation was found to be considerable. A one percent change in line voltage produced a 40 percent change in flow rate at a constant resistance setting.

Powering the control circuit from a Sola constant voltage transformer (Catalogue No. 20-13-60) reduced this change of flow rate to less than 2 percent flow change per percent line voltage change. The sources of ambient temperature arise from the effect of temperature on the solenoid coil resistance and the effect of temperature on the unijunction transistor relaxation oscillator. Both of these effects were eliminated by adjusting the control resistors forming part of the control circuit, experimentally to produce no flow change on heating the components in question from 25 to 40° C. with a hot air gun.

The valve exhibited a wide dynamic range of stable operation and the results achieved were accurate to within a range of +/—0.5% over a three-week test period. Over shorter periods, such as one hour, deviation was about 0.15 percent. An inspection of the controllable factors reveals the remarkable characteristics of pulsed-solenoid control mode of action, such as the wide dynamic range over which modulating flow action can be obtained. It can be seen that this dynamic range was approximately 100 times greater than conventional control valves. Moreover, the response rate of the electrically operable control valve A was approximately 10 times faster than any of the tested conventional control valves.

The average force per cycle was determined by using a triple beam balance. This was accomplished by unscrewing the lower valve body thereby leaving the lower end of the plunger projecting from the plunger assembly. With the main spring still in its position, the upper body is suitable mounted above a triple beam balance with the lower face of the plunger adhesively secured to the balance pan. Vertical adjustment of the upper valve body and use of the balancing lines of the triple beam balance permitted a careful setting of the air gap. The balance reading, at this point, without power applied to the solenoid coil was then a measure of the spring plus gravity force holding the plunger against the valve seat. On the application of power to the coil, the change in balance reading at a constant air gap was then a measure of the average magnetic force of each pulse cycle, since the combined mass of the balance pan and the plunger adhesively secured thereto prevented vibration. If the valve were then assembled with this air gap, vibration and flow would begin at a constant control resistance of approximately 60K ohms. At this value, the average force is only 47 grams compared to 306 grams of spring force. This factor in itself, indicated that control action was not obtained by the magnetic force opposing the spring force which is the case in the usual steady-state manner.

Having examined the average force effects it is now possible to examine the maximum force effects. The maximum magnetic force generated during a voltage cycle is one of the more important variable factors to be determined in the electrically operable control valve. Its precise measurement is almost essential to a quantitative understanding of the pulsed-solenoid control action. The new vibration phenomenon provides a precise means of measuring this maximum magnetic force. The combined spring and gravity force is easily determined as a function of the air gap. Thus, at any given selected air gap, if the voltage across the solenoid coil is adjusted so that vibration just commences, the maximum force exerted upon the plunger must exactly equal the spring and gravity force shifting the plunger downwardly. The electrical measurements made under these conditions of incipient flow provide in addition to the electrical data, the maximum force occurring at these conditions. This data is included in Table I set forth below. It is in effect a summary of all electrical data taken under conditions of incipient flow. Table I illustrates the change of air gap with use of D.C. current, sine wave power and SCR power for operation of the control valve.

In determining the maximum force, there are two independent criteria. One criteria is the appearance of a small flow rate. The second criteria is a marked change in sound heard through a listening rod held against the valve. The new sound waves were those associated with vibration of the plunger off the seat and were of much higher frequency than the 60 cycle electrical hum. In practice these two criteria agreed within experimental error in the determination of lift-off.

TABLE I.—MAXIMUM FORCE AND ELECTRICAL DATA AT INCIPIENT VIBRATION POINT

| | Air gap, cm. | | | | | | |
|---|---|---|---|---|---|---|---|
| | 0.005 | 0.01 | 0.02 | 0.04 | 0.08 | 0.16 | (Assy.) 0.125 |
| Maximum force (grams) | 320 | 318 | 317 | 313 | 306 | 292 | 299 |
| D. C. current (milliamperes) | 24.0 | 33.0 | 45.0 | 63.0 | 90.0 | 131.0 | 115.0 |
| Sine wave power: | | | | | | | |
| Maximum current (milliamperes) | 29.5 | 37.5 | 48.7 | 67.2 | 96.0 | 131.0 | 118.8 |
| Impedance (ohms) | 1,205 | 1,108 | 995 | 842 | 674 | 545 | 588 |
| Inductance (henries)[1] | 3.26 | 2.90 | 2.50 | 2.02 | 1.521 | 1.151 | 1.274 |
| SCR power at $E_0$=168.5 volts: | | | | | | | |
| Firing angle | 0.0965 | 0.1070 | 0.1197 | 0.1340 | 0.1502 | 0.1670 | 0.1593 |
| Maximum current (milliamperes) | 22.4 | 30.2 | 42.1 | 62.3 | 94.4 | 139.1 | 119.5 |

[1] Calculated with iron-loss resistance of 2000 ohms.

Example 2

This example describes the use of the pulsed-solenoid valve B of the present invention and illustrates the mechanism of eliminating the two-state vibratory system with transistion therebetween and the elimination of a large rebound vibration. The Hoke solenoid valve S90A320TT of Example 1 was employed with the lower valve body and seat assembly removed. Threadedly secured to the lower end of the Hoke valve was the valve B of the present invention. An all-metal stainless steel plunger was employed in the valve with the bottom portion thereof milled to a relatively flat surface. Thereafter, a valve seat die constructed of ⅛" inner diameter copper-brass tubing with the upper end flared to a 60° conical section was employed to make a die for Teflon tubing. The Teflon tubing was thereafter used to make a valve seat with a conical section having a 40° angle with respect to the axial centerline of the tube. The Teflon tube had a length of ⅝ of an inch and was inserted within a stainless steel retainer sleeve. The retainer sleeve was formed of a ⁵⁄₁₆ inch outer diameter washer having a ⅛ inch inner diameter bore. Moreover, it was provided with an 82° counter sink at its upper end for accommodating the flared-out end of the Teflon tube. The washer thus provided a back-up for the Teflon cone. The lower end of the Teflon tube was then inserted into the intake orifice of the valve 40 and tightly pressed therein in a fluid-tight engagement with the walls of the inlet port. For a seating ball, a ⁷⁄₃₂ inch ball bearing was inserted between the lower end of the valve plunger and the conically shaped seat in a free floating state. With an all-metal plunger of the type immediately described, the flow was slightly unstable. Various other seating angles of 75°, 82°, 90°, and 140° with respect to the axial centerline of the valve were tried. When an 82° angle in the seat formation was employed stable results were achieved. A ⁵⁄₁₆ inch Teflon ring having a ⅛ inch central core with a diameter of approximately 0.005 inch greater than the steel part of the plunger was disposed between the valve body and the steel retainer ring. The Teflon ring was secured as a back-up washer and prevented the steel retainer ring from vibrating against the body of the valve and also aided in the reduction of uncontrolled radial vibration.

More significantly, the valve with air flow operated well with a variac power source without instability with almost negligiable rebound vibration. It appeared as though the energy was dissipated on contact with the seat and was converted into three-way multiple collisions with the seat, the free floating valve and the plunger.

It was discovered that high frequency noise could be drastically reduced by radial guidance of the valve plunger. A 0.065 inch outer diameter Teflon strip was inserted within each of the four flutes of the valve plunger. The strips were pressed into the flutes with flat pieces of steel and tightly pressed to give a 0.002 inch clearance in the lower valve body. This prevents metal to metal contact and apparently operated to dampen the radial vibrations so that only one dimensional vibration predominated.

Thereafter, an all-Teflon sheath was disposed tightly around the valve plunger and inserted into the tube of the upper portion of the valve. The plunger was formed of 430F stainless steel material with a 0.250 inch outer diameter. The Teflon sheath had an outer diameter dimension of 0.376 inch and was drilled to form a 0.246 inch bore for accommodating the valve plunger. The upper end thereof was fit flush with the upper end of the valve plunger. It was again found that by radial guidance of the valve plunger in the manner with the employment of the Teflon sheath, the two-state vibratory system was eliminated and the rebound vibrations were substantially eliminated.

Example 3

This example describes the use of the pulsed-solenoid control valve A of the present invention and illustrates the reduction of axial vibrations of the valve plunger and elimination of the two stable-state transition system of the valve plunger. The Hoke valve employed in Example 2 was also used in this example except that the ball bearing was removed. The Teflon valve seat was maintained at an angle of approximately 82° and the lower end of the valve plunger was milled to form 90° conically shaped point which was designed to seat against the 82° conically shaped valve seat. Again, the valve plunger was jacketed in a Teflon sheath of the type employed in Example 2 and it was found that the two-state vibratory system was substantially eliminated. It was found that rebound vibrations were also substantially reduced to the point where they were negligible. The silicon controlled rectifier power source was then removed and the solenoid coil was powered by a variac. It was thereafter found that stable results were also obtained with very low rebound vibrations. It was found that the valve could be operated by the use of this variac without creating an unstable condition.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. An electrically operated control valve comprising a valve housing having inlet and outlet ports, a conically shaped valve seat associated with one of said ports, and having an included angle within the range of 80° to 84° with respect to the axial centerline of said housing, a movable plunger disposed within said housing and being adapted to move to and away from said seat, said plunger having a conically shaped end which is adapted to seat in fluid-tight engagement with said valve seat, said conically shaped end having an included angle within the range of 85° to 95°, said plunger being axially offset with respect to said valve seat so that nonconcentric contact exists between said seat and said plunger, mechanical means associated with said plunger and biasing said plunger in a first direction toward said seat, electromagnetic means associated with said plunger and biasing said plunger in a second direction away from said seat, and means for generating control pulses operatively associated with said electromagnet means for causing said plunger to vibrate between said first and second direction, thereby controlling the amount of fluid flow through said valve.

2. In a dithering solenoid actuated valve including a housing having a wall forming an internal chamber, said valve having an inlet port and an outlet port opening into said chamber, a valve seating and vibratory control mechanism operatively associated with one of said ports and being capable of reducing a rebound vibratory action of a plunger element moving with respect to said mechanism, said mechanism including a conically shaped valve seat, said plunger having a conically shaped end which is adapted to seat in operative fluid-tight engagement with said valve seat, the conically shaped end of said plunger having a greater included angle than said valve seat, and means relative to said valve plunger and valve seat creating a lack of concentricity therebetween to enable an operative contact between said plunger and said seat in such nonconcentric manner that axial momentum is translated into radial vibratory action, to thereby create a controlled radial vibratory action on said plunger and causing said plunger to dispel energy of axial momentum by side-to-side radial displacement.

3. The valve seating mechanism of claim 2 further characterized in that said seat has an included angle within the range of 80° to 84° with respect to the axial centerline of said internal chamber, and said conically shaped end has an included angle within the range of 85° to 95°.

4. The valve seating mechanism of claim 2 further characterized in that means is provided for applying a force pulse to said electromagnetic means causing dithering action of said plunger, and means for controlling the size of said force pulse and for regulating the quiescent period between said successive pulses to enable dampening of said radial displacement before initiation of axial movement of said plunger.

5. In a dithering solenoid actuated valve including a housing having a wall forming an internal chamber, said valve having an inlet port and an outlet port opening into said chamber, a valve seating and vibratory control mechanism operatively associated with one of said ports and being capable of reducing a rebound vibratory action of a plunger element moving with respect to said mechanism, said mechanism including a conically shaped valve seat, a seating ball disposed within said valve seat, said plunger having a relatively flat bottom wall which is engageable against said ball and adaptable to urge said ball in operative fluid-tight engagement with said valve seat, said seating ball being movable in a direction away from said seat to the extent of axial movement of said plunger, and means relative to said valve plunger and valve seat creating a lack of concentricity therebetween to enable an operative contact between said plunger and said seat in such nonconcentric manner that axial momentum is translated into radial vibratory action, to thereby create a controlled radial vibratory action on said plunger and causing said plunger to dispel energy of axial momentum by side-to-side radial displacement.

6. The valve seating mechanism of claim 5 further characterized in that means is provided for applying a force pulse to said electromagnetic means causing dithering action of said plunger, and means for controlling the size of said force pulse and for regulating the quiescent period between said successive pulses to enable dampening of said radial displacement before initiation of axial movement of said plunger.

7. The valve seating mechanism of claim 2 further characterized in that said seat is formed of plastic material which is capable of resisting cold flow.

8. The valve seating mechanism of claim 5 further characterized in that said seat is formed of plastic material which is capable of resisting cold flow.

9. The valve seating mechanism of claim 7 further characterized in that said plastic material is constrained by a metal restraining member.

10. The valve seating mechanism of claim 8 further characterized in that said plastic material is constrained by a metal restraining member.

11. The valve heating mechanism of claim 9 further characterized in that a cushion formed of a plastic material capable of resisting cold flow is disposed in supporting position against said metal restraining member.

12. The valve seating mechanism of claim 10 further characterized in that a cushion formed of a plastic material capable of resisting cold flow is disposed in supporting position against said metal restraining member.

13. The valve seating mechanism of claim 2 further characterized in that said plunger is provided with a plurality of radially extending nonmagnetic spacer strips for elimination of multistable vibration states.

14. The valve seating mechanism of claim 2 further characterized in that said plunger is provided with a circumferentially disposed nonmagnetic sheath for elimination of multistable vibration states.

15. The valve seating mechanism of claim 5 further characterized in that said plunger is provided with a plurality of radially extending nonmagnetic spacer strips for elimination of multistable vibration states.

16. The valve seating mechanism of claim 5 further characterized in that said plunger is provide with a circumferentially disposed nonmagnetic sheath for elimination of multistable vibration states.

17. A dithering solenoid actuated valve comprising a valve housing, a wall in said housing and having an interior surface forming an internal chamber, said housing having an inlet port and an outlet port opening into said chamber, a valve plunger shiftably disposed in said chamber and being shiftable away from and toward one of said ports, electromagnetic means operatively disposed about said wall and causing a dithering action of said valve plunger a valve seating and vibratory control mechanism operatively associated with one of said ports and being capable of reducing a rebound vibratory action of said valve plunger which moves with respect to said mechanism, said mechanism including a conically shaped valve seat, said plunger having a conically shaped end which is adapted to seat in operative fluid-tight engagement with said valve seat, the conically shaped end of said plunger having a greater included angle than said valve seat, and means relative to said valve plunger and valve seat creating a lack of concentricity therebetween to enable an operative contact between said plunger and said seat in such nonconcentric manner that axial momentum is translated into radial vibratory action to thereby create a controlled radial vibratory action on said plunger and causing said plunger to dispel energy of axial momentum by side-to-side radial displacement.

18. The valve seating mechanism of claim 17 further characterized in that said seat has an included angle within the range of 80° to 84° with respect to the axial centerline of said internal chamber, and said conically shaped end has an included angle within the range of 85° to 95°.

19. The valve seating mechanism of claim 17 further characterized in that means is provided for applying a force pulse to said electromagnetic means causing dithering action of said plunger, and means for controlling the size of said force pulse and for regulating the quiescent period between said successive pulses to enable dampening of said radial displacement before initiation of axial movement of said plunger.

20. A dithering solenoid actuated valve comprising a valve housing, a wall in said housing and having an interior surface forming an internal chamber, said housing having an inlet port and an outlet port opening into said chamber, a valve plunger shiftably disposed in said chamber and being shiftable away from and toward one of said ports, electromagnetic means operatively disposed about said wall and causing a dithering action of said valve plunger, and a valve seating and vibratory control mechanism operatively associated with one of said ports and being capable of reducing a rebound vibratory action of said valve plunger which moves with respect to said mechanism, said mechanism including a conically shaped valve seat a seating ball disposed within said valve seat, said plunger having a relatively flat bottom wall which is engageable against said ball and adaptable to urge said ball in operative fluid-tight engagement with said valve seat, said seating ball being movable in a direction away from said seat to the extent of axial movement of said plunger, and means relative to said valve plunger and valve seat creating a lack of concentricity therebetween to enable an operative contact between said plunger and said seat in such noncencentric manner that axial momentum is translated into radial vibratory action, to thereby create a controlled radial vibratory action on said plunger and causing said plunger to dispel energy of axial momentum by side-to-side radial displacement.

21. The valve seating mechanism of claim 20 further characterized in that means is provided for applying a force pulse to said electromagnetic means causing dithering action of said plunger, and means for controlling the size of said force pulse and for regulating the quiescent period between said successive pulses to enable dampening of said radial displacement before initiation of axial movement of said plunger.

22. The solenoid valve of claim 17 further characterized in that said movable element is circular in cross section.

23. The solenoid valve of claim 17 further characterized in that said movable element shifts no more than 0.005 inch at maximum axial vibration.

24. The solenoid valve of claim 20 further characterized in that said movable element is circular in cross section.

25. The solenoid valve of claim 20 further characterized in that said movable element shifts no more than 0.005 inch at maximum axial vibration.

26. A dynamically operable control device comprising a housing provided with an internal chamber having an internal wall, said chamber having a pair of fluid ports opening thereinto, a movable element disposed within said internal chamber and being axially shiftable between a first and second end position, one of said ports being located at said first end position, means associated with said housing for applying a force pulse to said movable element to bias said element in a second direction toward said second end position, means for regulating the size of said force pulse to produce a net unbalance of forces on the movable element to cause the movable element to move toward the second end position, a seating and vibratory control mechanism operatively associated with the port at said second end position and being capable of reducing a rebound vibratory action, said mechanism including a conically shaped seat, said movable element having a conically shaped end which is adapted to seat in operative fluid-tight engagement with said seat, the conically shaped end of said element having a greater included angle than said seat, and means relative to said movable element and seat creating a lack of concentricity therebetween to enable an operative contact between said element and said seat in such manner that axial momentum is translated into radial vibratory action to thereby create a controlled radial vibratory action on said element and causing said element to dispel energy of axial momentum by side-to-side radial displacement.

27. A dynamically operable control device comprising a housing provided with an internal chamber having an internal wall, said chamber having a pair of fluid ports opening thereinto, a movable element disposed within said internal chamber and being axially shiftable between a first and second end position, one of said ports being located at said first end position, means associated with said housing for applying a force pulse to said movable element to bias said element in a second direction toward said second end position, means for regulating the size of said force pulse to produce a net unbalance of forces on the movable element to cause the movable element to move toward the second end position, a seating and vibratory control mechanism operatively associated with the port at said second end position and being capable of reducing a rebound vibratory action, said mechanism including a conically shaped seat, and a seating ball disposed within said seat, said element having a relatively flat bottom wall which is engageable against said ball and adaptable to urge said ball in operative fluid-tight engagement with said seat, said seating ball being movable in a direction away from said seat to the extent of axial movement of said movable element, and means relative to said movable element and seat creating a lack of concentricity therebetween to enable an operative contact between said element and said seat in such manner that axial momentum is translated into radial vibratory action to thereby create a controlled radial vibratory action on said element and causing said element to dispel energy of axial momentum by side-to-side radial displacement.

28. The method of controlling the amplitude of vibration of a movable element in a dynamically operable device, wherein the movable element is capable of axial shifting in a first and second direction between a first and second end position, said method comprising axially biasing said element with a substantially constant force in said first direction towards said first end position where movement of the element is restricted by said first end position, causing said element to engage said first end position in a nonconcentric manner that axial momentum is translated into radial vibratory action to thereby create a controlled radial vibratory action on said element and causing said element to dispel energy of axial momentum by side-to-side radial displacement, applying a succession of force pulses to said movable element, each of said force pulses tending to bias said element in said second direction towards said second end position, regulating the size and duration of said force pulses to cause an axial vibration of said movable element.

29. The method of controlling the amplitude of vibration of a movable element in a dynamically operable device, wherein the movable element is capable of axial shifting in a first and second direction between a first and second end position, said method comprising axially biasing said element with a substantially constant force in said first direction towards said first end position where movement of the element is restricted by said first end position, causing said element to engage said first end position in a nonconcentric manner that axial momentum is translated into radial vibratory action to thereby create a controlled radial vibratory action on said element and causing said element to dispel energy of axial momentum by side-to-side radial displacement, applying a succession of force pulses to said movable element, each of said force pulses tending to bias said element in said second direction towards said second end position, guiding the movement of the movable element in the controlled axial shifting toward and away from the first and second end positions to prevent radial displacement during the controlled axial movement, and regulating the size and duration of said force pulses to cause an axial vibration of said movable element.

30. In a dithering solenoid actuated valve including a housing having a wall forming an internal chamber, said valve having an inlet port and an outlet port opening into said chamber, a valve seating and vibratory control mechanism operatively associated with one of said ports and being capable of reducing a rebound vibratory action of a plunger element moving with respect to said mechanism, said mechanism including a conically shaped valve seat, said plunger having an end which is adapted to seat in operative fluid-tight engagement with said valve seat, and means relative to said valve plunger and valve seat creating a lack of concentricity therebetween to enable an operative contact between said plunger and said seat in such nonconcentric manner that axial momentum is translated into radial vibratory action, to thereby create a controlled radial vibratory action on said plunger and causing said plunger to dispel energy of axial momentum by side-to-side radial displacement.

31. A dithering solenoid actuated valve comprising a valve housing, a wall in said housing and having an interior surface forming an internal chamber, said housing having an inlet port and an outlet port opening into said chamber, a valve plunger shiftably disposed in said chamber and being shiftable away from and toward one of said ports, electromagnetic means operatively disposed about said wall and causing a dithering action of said valve plunger, a valve seating and vibratory control mechanism operatively associated with one of said ports and being capable of reducing a rebound vibratory action of said valve plunger which moves with respect to said mechanism, said mechanism including a conically shaped valve seat, said plunger having an end which is adapted to seat in operative fluid-tight engagement with said valve seat, and means relative to said valve plunger and valve seat creating a lack of concentricity therebetween to enable an operative contact between said plunger and said seat in such nonconcentric manner that axial momentium is translated into radial vibratory action, to thereby create a controlled radial vibratory action on said plunger and causing said plunger to dispel energy of axial momentum by side-to-side radial displacement.

References Cited

UNITED STATES PATENTS

| | | | |
|---|---|---|---|
| 2,099,443 | 11/1937 | Kraft | 137—330 X |
| 2,551,334 | 5/1951 | Parks | 137—624.17 X |
| 2,669,247 | 2/1954 | Olah | 251—129 X |
| 2,766,064 | 10/1956 | Schweitzer | 137—330 X |
| 2,822,789 | 2/1958 | Philips et al. | 251—333 X |
| 2,843,147 | 7/1958 | Penther | 137—487.5 |
| 3,151,340 | 10/1964 | Teshima | 251—129 X |
| 3,307,824 | 3/1967 | Weisheit | 251—131 |

M. CARY NELSON, Primary Examiner

M. O. STURM, Assistant Examiner

U.S. Cl. X.R.

251—333